United States Patent
Wu

(10) Patent No.: US 12,215,795 B2
(45) Date of Patent: Feb. 4, 2025

(54) INFLATOR VALVE CONNECTOR

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 16 days.

(21) Appl. No.: 18/333,644

(22) Filed: Jun. 13, 2023

(65) Prior Publication Data

US 2024/0418281 A1    Dec. 19, 2024

(51) Int. Cl.

| | |
|---|---|
| *F16L 37/18* | (2006.01) |
| *F16K 24/00* | (2006.01) |
| *F16K 31/524* | (2006.01) |
| *F16L 37/05* | (2006.01) |
| *F16L 37/20* | (2006.01) |
| *F16L 37/40* | (2006.01) |

(52) U.S. Cl.
CPC ............ *F16K 24/00* (2013.01); *F16K 31/524* (2013.01); *F16L 37/05* (2013.01); *F16L 37/20* (2013.01); *F16L 37/40* (2013.01)

(58) Field of Classification Search
CPC .... F16K 24/00; F16K 31/524; F16K 17/0486; F16K 15/20; B60C 29/005; B60C 29/002; Y10T 137/3584; F16L 37/05; F16L 37/20; F16L 37/40; F04B 33/005; F04B 39/123; B60S 5/04
See application file for complete search history.

(56) References Cited

U.S. PATENT DOCUMENTS

| | | | | |
|---|---|---|---|---|
| 3,923,325 | A * | 12/1975 | Slater, Jr. ................ | F16L 37/18 285/423 |
| 6,786,247 | B1 * | 9/2004 | Kemppainen ........... | F16L 37/05 141/84 |
| 8,297,301 | B2 * | 10/2012 | Wu ......................... | F16L 37/00 251/297 |
| 8,402,987 | B2 * | 3/2013 | Wang ...................... | B60S 5/043 251/149.1 |
| 8,757,194 | B2 * | 6/2014 | Huang .................... | B60C 29/06 152/415 |
| 2017/0276278 | A1 * | 9/2017 | Wang ...................... | F16L 37/18 |

FOREIGN PATENT DOCUMENTS

| | | | | |
|---|---|---|---|---|
| DE | 19812961 | A1 * | 5/1999 | ................ B60S 5/04 |
| DE | 19927955 | A1 * | 2/2000 | ................ B60S 5/04 |

* cited by examiner

*Primary Examiner* — Marina A Tietjen
(74) *Attorney, Agent, or Firm* — MUNCY, GEISSLER, OLDS & LOWE, P.C.

(57) ABSTRACT

An inflator valve connector includes a body, a guiding member and a lever. The body has a connecting end, an operating end and a guiding hole. The guiding member is rotatably and movably inserted through the guiding hole and is movable relative to the guiding hole between a first position and a second position. The guiding member has a pushing end, an inlet end and an air passage extending from the pushing end to the inlet end and communicating with the guiding hole. The lever is pivotally mounted to the operating end to selectively abut against the guiding member in a unlock position and a lock position, and the lever is configured to actuate the guiding member to move relative to the guiding hole.

8 Claims, 4 Drawing Sheets

INFLATOR VALVE CONNECTOR

BACKGROUND OF THE INVENTION

The present invention relates to an inflator valve connector and, more particularly, to an inflator valve connector that can prevent air from leaking from the air valve when connecting or disconnecting the valve.

When the valve connector of a conventional air pump connects or disconnects an air valve, there is inevitably a brief leakage of air. Further, when the user inflates an object to the desired pressure and then detaches the valve connector from the object's air valve, at the moment the valve connector is disconnected, the sealing ring inside the valve connector cannot seal the periphery of the air valve. However, the spindle of the valve connector is still in a position where it depresses the core of the air valve, causing the air inside the object to escape from the valve stem. This results in the actual pressure of the inflated object being lower than the desired pressure, making it impossible to achieve the precise desired pressure.

Thus, a need exists for an inflator valve connector to mitigate and/or obviate the above disadvantages.

SUMMARY OF THE INVENTION

An objective of the present invention is to provide an inflator valve connector that includes a body, a guiding member and a lever. The body has a connecting end for connecting an air valve, an operating end opposite to the connecting end, and a guiding hole extending from the connecting end to the operating end. The guiding member is rotatably inserted through the guiding hole and is movable relative to the guiding hole between a first position and a second position. The guiding member has a pushing end for pushing a valve core of the air valve, an inlet end for connecting to a high pressure air source, and an air passage extending from the pushing end to the inlet end and communicating with the guiding hole. The lever is pivotally mounted to the operating end to selectively abut against the guiding member in a unlock position and a lock position. The lever is configured to actuate the guiding member to move relative to the guiding hole.

In an embodiment, the body is provided with an inner threaded portion formed on an inner wall surface of the guiding hole adjacent to the connecting end. The inner threaded portion is detachably engaged with an outer threaded portion of the air valve.

In an embodiment, the body is further provided with a connecting groove disposed at the operating end and communicating with the guiding hole. The lever is pivotally mounted to the connecting groove and pivotable relative to the connecting groove between the unlock position and the lock position.

In an embodiment, the body is further provided with at least one first pivoting portion formed on an inner wall surface of the connecting groove. The lever is provided with at least one second pivoting portion and an actuating portion. The at least one second pivoting portion is pivotally connected to the at least one first pivoting portion.

In an embodiment, the number of the at least one first pivoting portion is two, and the two first pivoting portions are symmetrically protruded from the inner wall surface of the connecting groove. The number of the at least one second pivoting portion is two, and the two second pivoting portions are formed on a bottom side of the lever and each of the two second pivoting portions has an engaging groove. The two engaging grooves of the two second pivoting portions are pivotally engaged with the two first pivoting portions.

In an embodiment, the guiding member is further provided with an abutted portion formed on an outer peripheral surface thereof. The at least one second pivoting portion has a first abutting surface and a second abutting surface. The first abutting surface and the second abutting surface selectively abut against the abutted portion at the unlock position and the lock position, allowing the guiding member to move relative to the guiding hole and switch between the first position and the second position. When the lever is in the unlock position, the guiding member is in the first position, and the first abutting surface abuts against the abutted portion, causing the pushing end to contact the valve core of the air valve. When the lever is in the lock position, the guiding member is in the second position, and the second abutting surface abuts against the abutted portion, causing the pushing end to push against the valve core of the air valve to open the air valve, allowing the air valve communicating with the air passage.

In an embodiment, the guiding member is further provided with an airtight ring mounted around the outer peripheral surface thereof and disposed between the pushing end and the abutted portion. The airtight ring abuts against the inner wall surface of the guiding hole.

In an embodiment, the body is further provided with an airtight member on the inner wall surface of the guiding hole adjacent to the connecting end. The airtight member is disposed adjacent to the inner threaded portion.

In an embodiment, the body is further provided with an anti-slip portion formed on an outer peripheral surface thereof and disposed between the connecting end and the operating end.

The present invention will become clearer in light of the following detailed description of illustrative embodiments of this invention described in connection with the drawings.

DETAILED DESCRIPTION OF THE INVENTION

Figure 1:
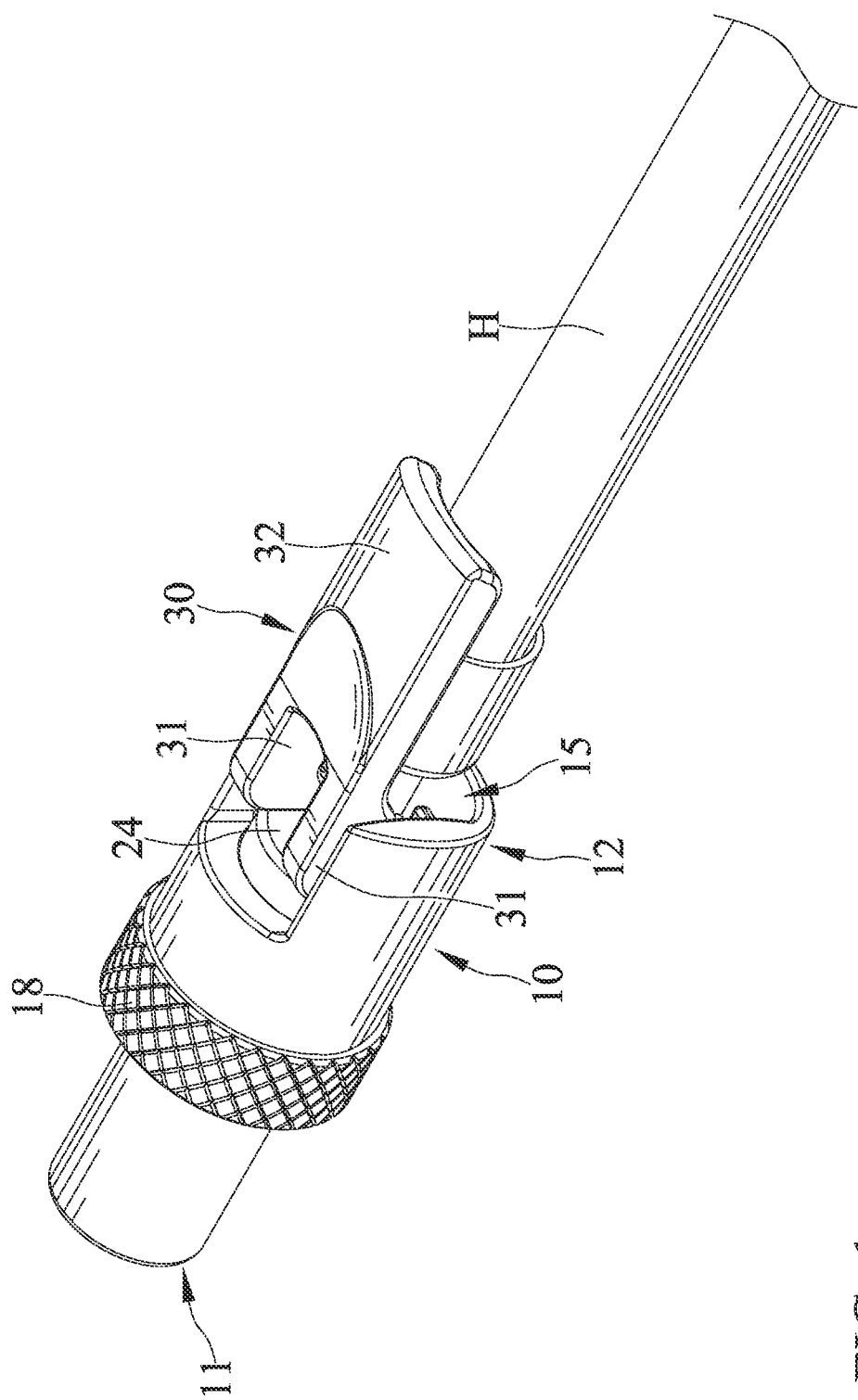
FIG. 1 is a perspective view of an inflator valve connector of an embodiment according to the present invention.
Figure 2:
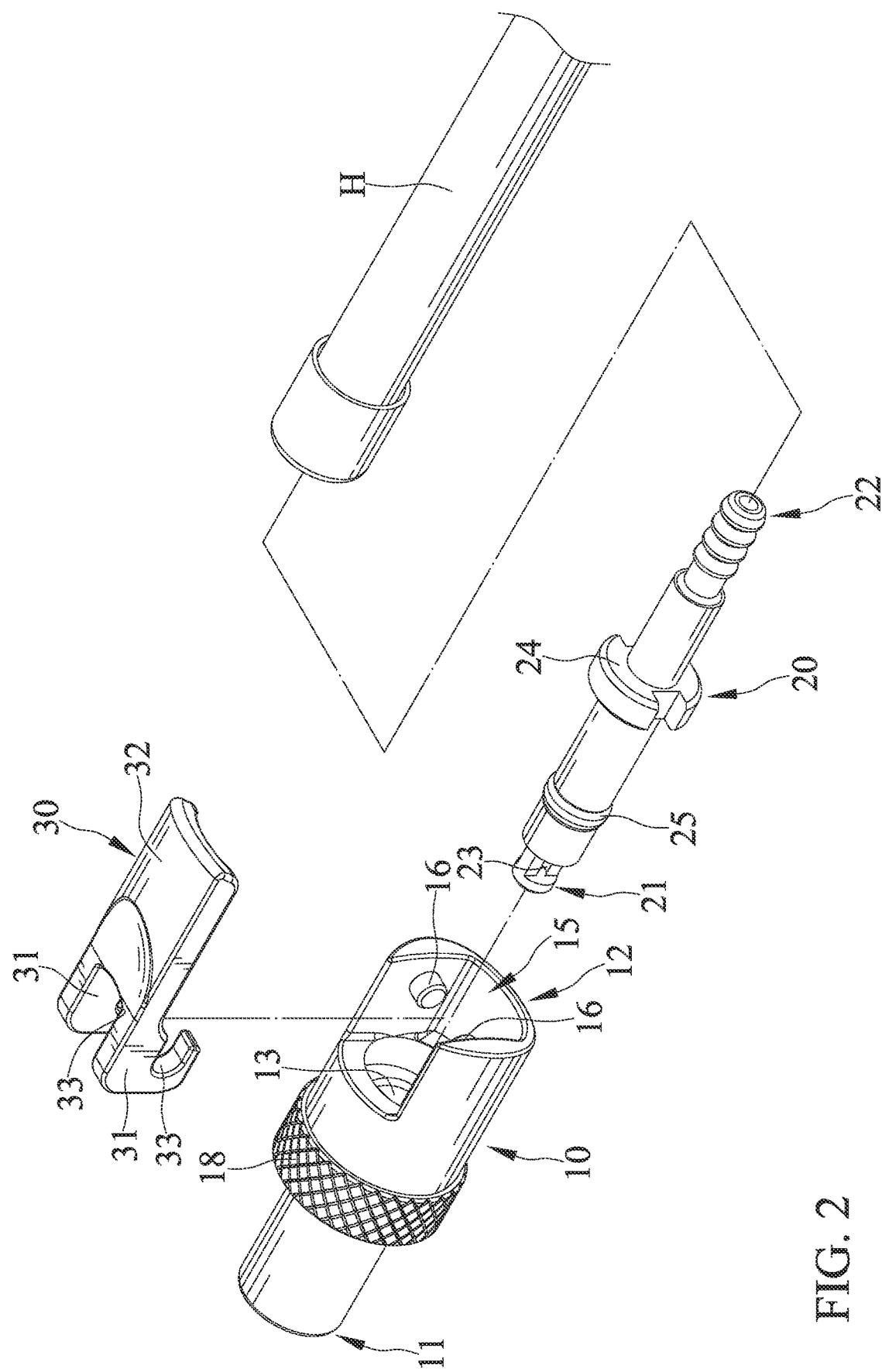
FIG. 2 is an exploded perspective view of the inflator valve connector of FIG. 1.

FIGS. 1-4 show an inflator valve connector of an embodiment according to the present invention. The inflator valve connector includes a body 10, a guiding member 20 and a lever 30. The body 10 has a connecting end 11 for connecting an air valve V, an operating end 12 opposite to the connecting end 11, and a guiding hole 13 extending from the connecting end 11 to the operating end 12. The guiding member 20 is rotatably inserted through the guiding hole 13 and movable relative to the guiding hole 13 between a first position and a second position. The guiding member 20 has a pushing end 21 for pushing a valve core VC of the air valve V, an inlet end 22 for connecting to a high pressure air source H, and an air passage 23 extending from the pushing end 21 to the inlet end 22 and communicating with the guiding hole 13. The high pressure air source H may be a pump, an inflation device, or any device capable of generating high pressure air. In the embodiment is a hose of an air pump. The lever 30 is pivotally mounted to the operating end 12 to selectively abut against the guiding member 20 in a unlock position and a lock position, and the lever 30 is configured to actuate the guiding member 20 to move relative to the guiding hole 13. Thus, the pushing end 21 of the guiding member 20 can selectively push against the valve core VC of the air valve V, thereby selectively communicating the air passage 23 with the air valve V.

The body 10 is provided with an inner threaded portion 14 formed on an inner wall surface of the guiding hole 13 adjacent to the connecting end 11, and the inner threaded portion 14 is detachably engaged with an outer threaded portion VT of the air valve V. Thus, the inner threaded portion 14 can engage with the outer threaded portion VT of the air valve V when the body (10) rotates with respect to the guiding member (20).

The body 10 is further provided with a connecting groove 15 disposed at the operating end 12 and communicating with the guiding hole 13. The lever 30 is pivotally mounted to the connecting groove 15 and pivotable relative to the connecting groove 15 between the unlock position and the lock position. Furthermore, the body 10 is further provided with at least one first pivoting portion 16 formed on an inner wall surface of the connecting groove 15, and the lever 30 is provided with at least one second pivoting portion 31 and an actuating portion 32. The at least one second pivoting portion 31 is pivotally connected to the at least one first pivoting portion 16. In the embodiment, the number of the at least one first pivoting portion 16 is two, and the two first pivoting portions 16 are symmetrically protruded from the inner wall surface of the connecting groove 15. The number of the at least one second pivoting portion 31 is two, and the two second pivoting portions 31 are formed on a bottom side of the lever 30 and each of the two second pivoting portions 31 has an engaging groove 33, and the two engaging grooves 33 of the two second pivoting portions 31 are pivotally engaged with the two first pivoting portions 16.

Further, the guiding member 20 is further provided with an abutted portion 24 formed on an outer peripheral surface thereof. The at least one second pivoting portion 31 has a first abutting surface 311 and a second abutting surface 312, and the first abutting surface 311 and the second abutting surface 312 selectively abut against the abutted portion 24 at the unlock position and the lock position, allowing the guiding member 20 to move relative to the guiding hole 13 and switch between the first position and the second position. When the lever 30 is in the unlock position, the guiding member 20 is in the first position, and the first abutting surface 311 abuts against the abutted portion 24, causing the pushing end 21 to contact the valve core VC of the air valve V. When the lever 30 is in the lock position, the guiding member 20 is in the second position, and the second abutting surface 312 abuts against the abutted portion 24, causing the pushing end 21 to push against the valve core VC of the air valve V to open the air valve V, allowing the air valve V communicating with the air passage 23.

The guiding member 20 is further provided with an airtight ring 25 mounted around the outer peripheral surface thereof and disposed between the pushing end 21 and the abutted portion 24, and the airtight ring 25 abuts against the inner wall surface of the guiding hole 13. The body 10 is further provided with an airtight member 17 on the inner wall surface of the guiding hole 13 adjacent to the connecting end 11, and the airtight member 17 is disposed adjacent to the inner threaded portion 14.

Furthermore, the body 10 is further provided with an anti-slip portion 18 formed on an outer peripheral surface thereof and disposed between the connecting end 11 and the operating end 12. Thus, the user can rotate the anti-slip portion 18, causing the body 10 to rotate relative to the guiding member 20.

Figure 3:
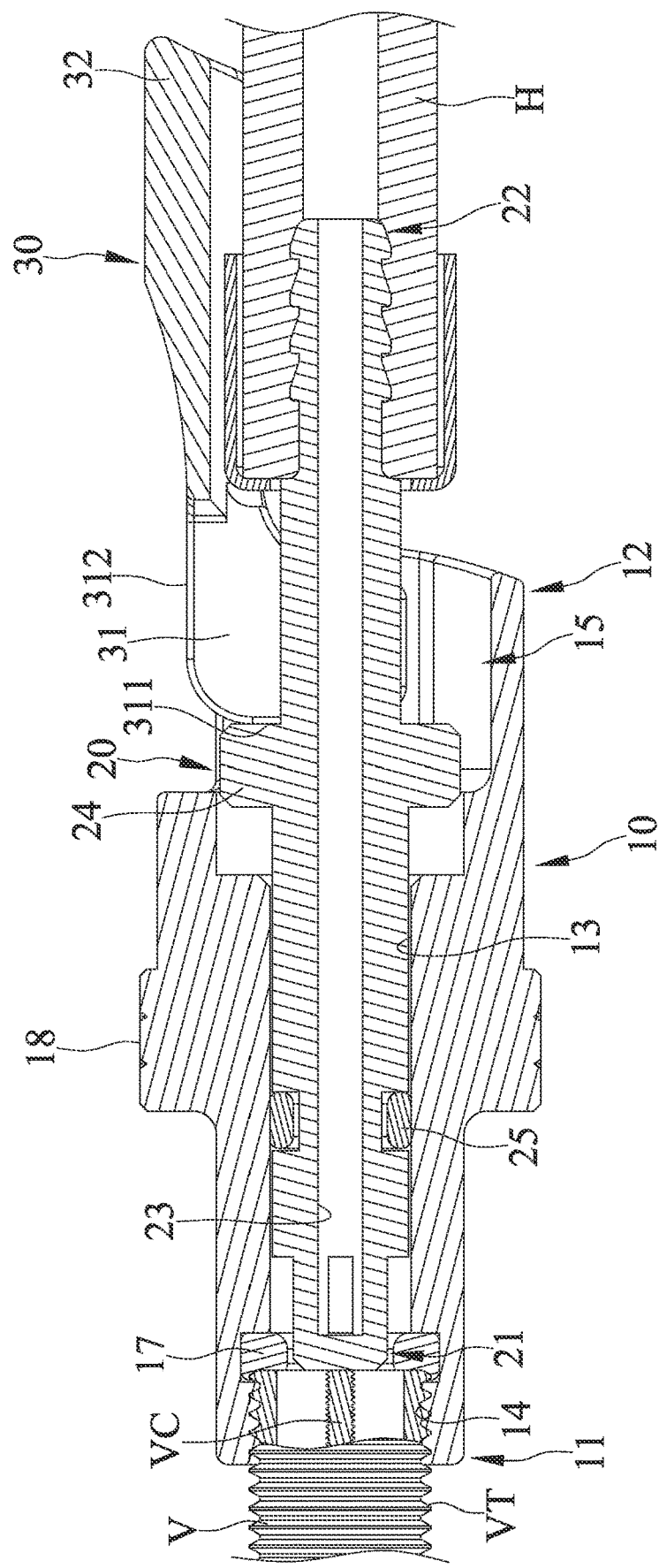
FIG. 3 is a cross sectional view of the inflator valve connector of FIG. 1 and shows a guiding member in a first position.

As shown in FIG. 3, the user can rotate the anti-slip portion 18, causing the body 10 to rotate relative to the top guiding member 20 and the inner threaded portion 14 to engage with the outer threaded portion VT of the air valve V, until the airtight member 17 contacts the air valve V to maintain air tightness. When the lever 30 is in the unlock position to contact the guiding member 20, the guiding member 20 is in the first position, and the first abutting surface 311 abuts against the abutted portion 24, causing the pushing end 21 only to contact the valve core VC of the air valve V without pushing it, disconnecting the air passage 23 from the air valve V to complete the preparation step before inflation.

Figure 4:
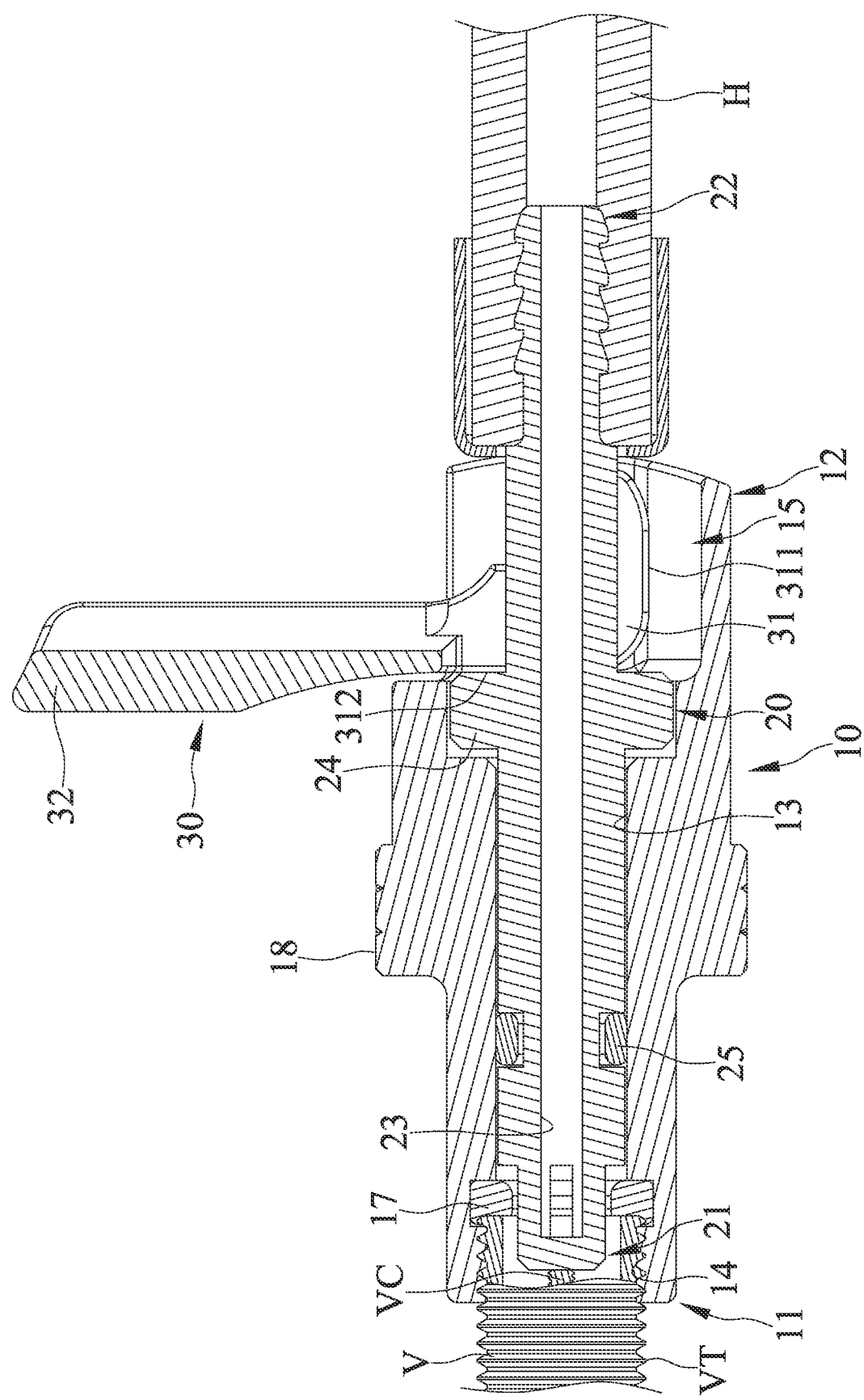
FIG. 4 is a continued view of FIG. 3 and shows the guiding member in a second position.

As shown in FIG. 4, the user can force the actuating portion 32 of the lever 30, causing the lever 30 pivoted relative to the connecting groove 15 to switch from the unlock position to the lock position. The abutted portion 24 of the guiding member 20 is pushed by the two second pivoting portions 31 of the lever 30 to move relative to the guiding hole 13 to switched from the first position to the second position. When the lever 30 is in the lock position and abuts against the guiding member 20, the guiding member 20 is in the second position, and the second abutting surface 312 abuts against the abutted portion 24, causing the pushing end 21 to push against the valve core VC of the air valve V to open the air valve V, allowing the air valve V communicating with the air passage 23. Thus, high pressure air from the high pressure air source H can enter the air valve V via the air passage 23 of the guiding member 20 for inflation. After inflation is complete, the user can force the lever 30 again, causing the lever 30 pivoted relative to the connecting groove 15 to return to the unlock position, and the guiding member 20 correspondingly returns to the first position. At this time, the air passage 23 disconnects from the air valve V, allowing the outer threaded portion VT of the air valve V to disengage from the inner threaded portion 14 of the body 10 to prevent air leakage from the air valve V.

Although specific embodiments have been illustrated and described, numerous modifications and variations are still possible without departing from the scope of the invention. The scope of the invention is limited by the accompanying claims.

The invention claimed is:

1. An inflator valve connector comprising:
   a body having a connecting end for connecting an air valve, an operating end opposite to the connecting end, and a guiding hole extending from the connecting end to the operating end, wherein the body is provided with an inner threaded portion formed on an inner wall surface of the guiding hole adjacent to the connecting end, and wherein the inner threaded portion is detachably engaged with an outer threaded portion of the air valve;
   a guiding member rotatably inserted through the guiding hole and movable relative to the guiding hole between a first position and a second position, wherein the guiding member has a pushing end for pushing a valve core of the air valve, an inlet end for connecting to a high pressure air source, and an air passage extending from the pushing end to the inlet end and communicating with the guiding hole; and a lever pivotally mounted to the operating end to selectively abut against the guiding member in a unlock position and a lock position, and wherein the lever is configured to actuate the guiding member to move relative to the guiding hole;

wherein the body is configured to rotate relative to the guiding member to cause the inner threaded portion to engage with or disengage from the outer threaded portion of the air valve.

2. The inflator valve connector as claimed in claim 1, wherein the body is further provided with a connecting groove disposed at the operating end and communicating with the guiding hole, and wherein the lever is pivotally mounted to the connecting groove and pivotable relative to the connecting groove between the unlock position and the lock position.

3. The inflator valve connector as claimed in claim 2, wherein the body is further provided with at least one first pivoting portion formed on an inner wall surface of the connecting groove, wherein the lever is provided with at least one second pivoting portion and an actuating portion, and wherein the at least one second pivoting portion is pivotally connected to the at least one first pivoting portion.

4. The inflator valve connector as claimed in claim 3, wherein the number of the at least one first pivoting portion is two, wherein the two first pivoting portions are symmetrically protruded from the inner wall surface of the connecting groove, wherein the number of the at least one second pivoting portion is two, wherein the two second pivoting portions are formed on a bottom side of the lever and each of the two second pivoting portions has an engaging groove, and wherein the two engaging grooves of the two second pivoting portions are pivotally engaged with the two first pivoting portions.

5. The inflator valve connector as claimed in claim 3, wherein the guiding member is further provided with an abutted portion formed on an outer peripheral surface thereof, wherein the at least one second pivoting portion has a first abutting surface and a second abutting surface, and wherein the first abutting surface and the second abutting surface selectively abut against the abutted portion at the unlock position and the lock position, allowing the guiding member to move relative to the guiding hole and switch between the first position and the second position; wherein when the lever is in the unlock position, the guiding member is in the first position, and the first abutting surface abuts against the abutted portion, causing the pushing end to contact the valve core of the air valve; and wherein when the lever is in the lock position, the guiding member is in the second position, and the second abutting surface abuts against the abutted portion, causing the pushing end to push against the valve core of the air valve to open the air valve, allowing the air valve communicating with the air passage.

6. The inflator valve connector as claimed in claim 5, wherein the guiding member is further provided with an airtight ring mounted around the outer peripheral surface thereof and disposed between the pushing end and the abutted portion, and wherein the airtight ring abuts against the inner wall surface of the guiding hole.

7. The inflator valve connector as claimed in claim 1, wherein the body is further provided with an airtight member on the inner wall surface of the guiding hole adjacent to the connecting end, and wherein the airtight member is disposed adjacent to the inner threaded portion.

8. The inflator valve connector as claimed in claim 1, wherein the body is further provided with an anti-slip portion formed on an outer peripheral surface thereof and disposed between the connecting end and the operating end.

\* \* \* \* \*